May 6, 1941. E. C. GARRATT 2,241,085
CONTAINER FOR FLOUR AND SIMILAR PRODUCTS
Filed May 26, 1938
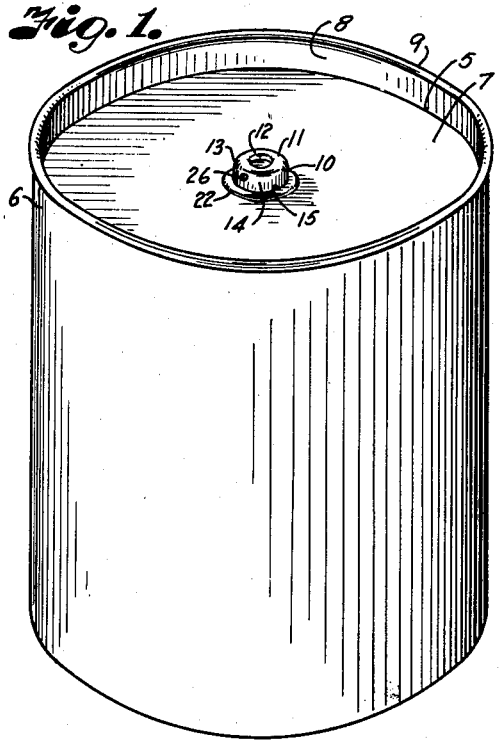
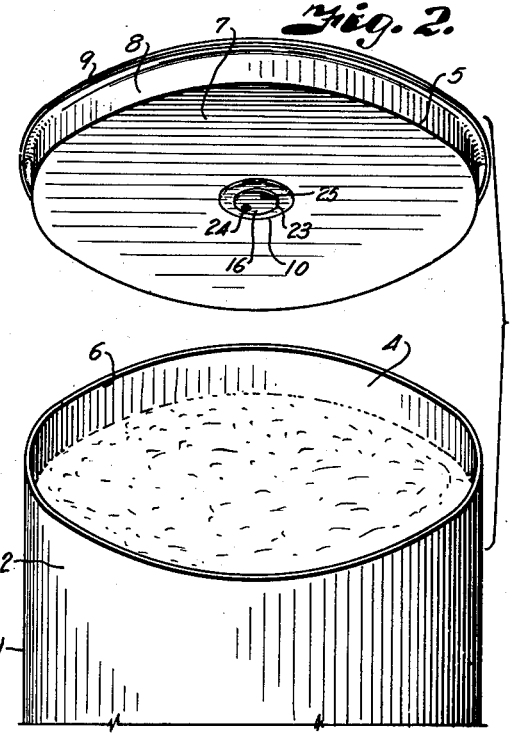
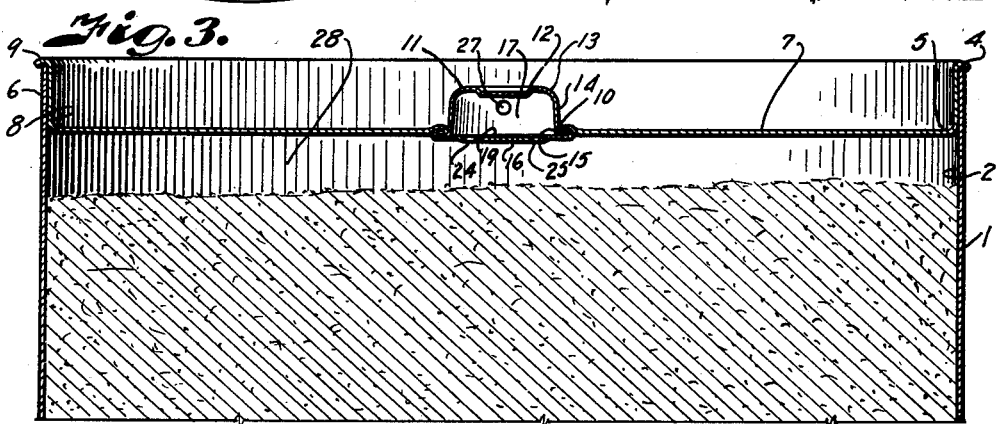
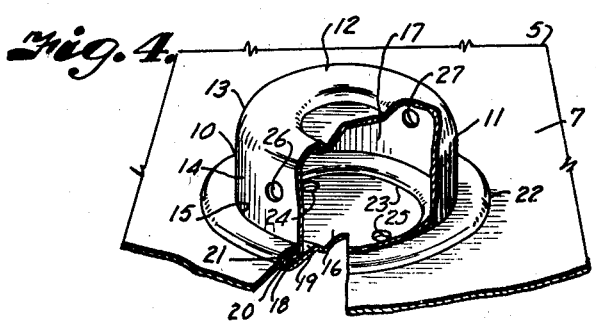
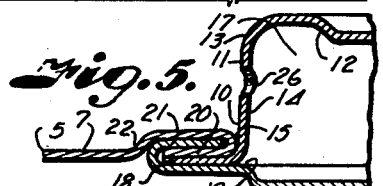
INVENTOR
Earl C. Garratt.
BY
ATTORNEY Patented May 6, 1941

2,241,085

UNITED STATES PATENT OFFICE 2,241,085

CONTAINER FOR FLOUR AND SIMILAR PRODUCTS

Earl C. Garratt, Kansas City, Mo., assignor to The Kansas Flour Mills Corporation, Kansas City, Mo., a corporation of Delaware Application May 26, 1938, Serial No. 210,285

1 Claim. (Cl. 220—44)

This invention relates to containers, particularly to those for packaging flour and similar products, and has for its principal object to provide a metal container constructed to keep the contents in fresh, wholesome condition.

Flour and cereal products containing moisture have not been successfully packaged in metal containers for the reason that metal is a good conductor and is subject to quick changes in temperature with the result that the contained moisture condenses upon the inside surface of the container and drips upon the contents. This moisture causes crusting of the contents and spoils the appearance of the product when the container is opened.

It is, therefore, an important object of the present invention to provide the container with a vent or breather opening whereby the interior and exterior temperatures are kept sufficiently equalized to prevent condensation and to permit sufficient breathing for carrying away the moisture laden air from the container.

Other important objects of the invention are to provide the container with a vent constructed for excluding dust, vermin, and other elements, and which is arranged for preventing loss of flour upon handling of the container; to provide a container of simple, inexpensive construction which is comparative in cost with other methods of packaging flour and similar products; and to provide a container that is more convenient for the purchaser and which retains the product in better condition while it is being used.

In accomplishing these and other objects of the invention, as hereinafter pointed out, I have provided improved details of structure, the preferred form of which is illustrated in the accompanying drawing, wherein:

Fig. 1 is a perspective view of a container constructed in accordance with the present invention.

Fig. 2 is a perspective view of the upper portion of the container showing the lid or cover in removed spaced relation.

Fig. 3 is an enlarged, cross-section through the upper end and lid of the container, particularly illustrating the vent therein.

Fig. 4 is a detail perspective view of a portion of the lid carrying the vent, a part of the vent being broken away to better illustrate the construction thereof.

Fig. 5 is an enlarged sectional view through the seam formed between the vent member and the container lid.

Referring more in detail to the drawing:

1 designates a container constructed in accordance with the present invention for packaging flour, cereals and similar products having contained moisture. The container illustrated includes a cylindrical metal wall 2 having a closed bottom 3 and an open top 4 normally covered by a lid 5 also formed of metal and adapted to fit within the rim 6 of the wall 2. The lid or cover 5 includes a substantially flat, disk-like portion 7 having a laterally extending annular flange 8 snugly engageable within the open end of the wall 2 and terminating in a laterally and outwardly extending lip 9 for engaging over the rim 6, the flange 8 being of sufficient depth to inset the disk portion 7 a sufficient distance to accommodate a vent 10.

The vent 10 includes a dome-shaped member 11 having a slightly crowned head 12 rounding at its periphery, as at 13, into a cylindrical wall portion 14 that is mounted within an opening 15 of the disk portion of the cover, and which cooperates with a closure plate 16 to form a closed chamber or trap 17. The wall 14 terminates in a laterally extending annular flange 18, which is clampingly retained between the upper face 19 of the plate 16 and a hook-like flange 20 that is formed about the periphery of the opening 15 and which lockingly engages with a hook-like flange 21 formed about the periphery of the plate 16, as clearly shown in Fig. 5, to form a leak-tight joint and to securely anchor the vent members in the lid of the container. In formation of the seam it is offset from the upper face of the disk portion 7, as at 22, and the portion of the plate registering with the chamber or trap 17 is offset in a downward direction to provide a depressed portion 23. The plate 16 is provided with diametrically spaced apertures 24 and 25 located in the marginal edge of the depressed portion and flush with the upper surface thereof to connect the interior of the container with the chamber or trap 17, wherethrough the interior of the container is vented to the chamber 17, which in turn is vented to atmosphere through apertures 26 and 27 opening laterally through the wall 14 and which are arranged diametrically at right angles to the diametric arrangement of the apertures 24 and 25 so that the respective apertures have maximum spacing therebetween, as clearly shown in Fig. 4.

It is therefore obvious that the air space 28 between the contents 29 of the container and the disk portion 7 of the lid is vented through the openings 24—25 and 26—27 so that the air in the space 28 is kept at substantially the same temperature as the surrounding atmospheric air. Therefore the respective inner and outer surfaces of the container are kept at substantially the same temperature to prevent condensation of any moisture absorbed by the air in the space 28 from the contents of the container. It is further obvious that movement of air through the vent carries off moisture absorbed from the contents so that the contents of the container is kept in fresh, wholesome condition and entirely free from crusting and other ill effects normally tending to spoil the appearance of the contents when the container is opened.

Since flour and similar products are relatively loose and of fluffy character, handling of the container causes the flour to puff through apertures 24 and 25 incidental to compression and expansion of the space 28 by reason of the flexible nature of the walls of the container. The chamber or trap 17, however, retards this tendency and any flour that passes through the apertures 24 and 25 is deflected and trapped therein without passing on through the lateral apertures 26 and 27. When any flour passes into the chamber 17 it immediately settles into the downset portion of the plate 16 and sifts back through the openings 24 and 25 into the container. The lateral location of the openings 26 and 27 prevents infiltration of dust, vermin and other elements that are ordinarily destructive to flour and similar products.

Since the container is of metal it is vermin and moisture-proof so that the flour may be kept in good condition while stocked by the merchant, as well as during the time it is being kept by the purchaser. The vent for free flow of air facilitates application and removal of the cover without waste of flour. The container is also desirable in that it eliminates the necessity of emptying the flour into other containers when being used by the purchaser.

What I claim and desire to secure to Letters Patent is:

In a container, a lid having a plane-like under surface provided with an opening therethrough, a dome-like member inset in said opening and having a vent aperture in the side thereof, a plate cooperating with the dome-like member to form a trapping chamber and having a centrally depressed plane-like portion provided with an open vent aperture located in the margin of said depressed portion and flush with the upper surface of the plate, and means connecting the dome-like member including said plate to the lid with said depressed plane portion substantially parallel with and spaced below the plane-like under surface of the lid whereby said plane-like surfaces tend to deflect contents of the container away from the aperture in said plate, said depressed portion of the plate forming a shallow sump in the bottom of the trapping chamber across which any trapped contents of the container sifts into the container through said vent aperture in the plate.

EARL C. GARRATT.